United States Patent [19]

Edwards

[11] Patent Number: 4,624,054
[45] Date of Patent: Nov. 25, 1986

[54] SAW GUIDE HAVING PIVOTAL PROTRACTOR MEANS

[76] Inventor: Gary L. Edwards, 896 Dunn St., Morristown, Tenn. 37814

[21] Appl. No.: 763,295

[22] Filed: Aug. 7, 1985

[51] Int. Cl.$^4$ .............................................. B27B 9/04
[52] U.S. Cl. ........................................ 30/374; 30/376
[58] Field of Search ................. 30/371, 373, 375, 376; 83/454, 486.1

[56] References Cited

U.S. PATENT DOCUMENTS

| | | | |
|---|---|---|---|
| 1,602,798 | 10/1926 | Lee | 30/376 |
| 2,818,892 | 1/1958 | Price | 83/454 |
| 3,344,824 | 10/1967 | Greco | 30/374 |
| 3,927,475 | 12/1975 | Chang | 30/373 X |
| 4,016,649 | 4/1977 | Kloster | 30/373 |
| 4,078,309 | 5/1978 | Wilson | 30/375 |
| 4,483,071 | 11/1984 | Kolste | 30/376 |

Primary Examiner—Jimmy C. Peters
Attorney, Agent, or Firm—Pitts and Brittian

[57] ABSTRACT

A saw guide (14) for controlling the linear path/direction of travel with respect to a reference on an object such as a board being cut, of a rotating saw blade is provided. The guide (14) includes a carriage (18) which carries a sleeve (36) along one longitudinal edge portion in the preferred embodiment. A travel control mechanism controls the direction of travel of the saw from a reference defined on an object to be cut. This mechanism (50) includes a protractor which is rotatably mounted on one end portion of the rod (44). A mechanism for adjusting the rotational position of the protractor with respect to the rod is provided. The protractor can be readily stored above the carriage (18) as desired.

14 Claims, 9 Drawing Figures

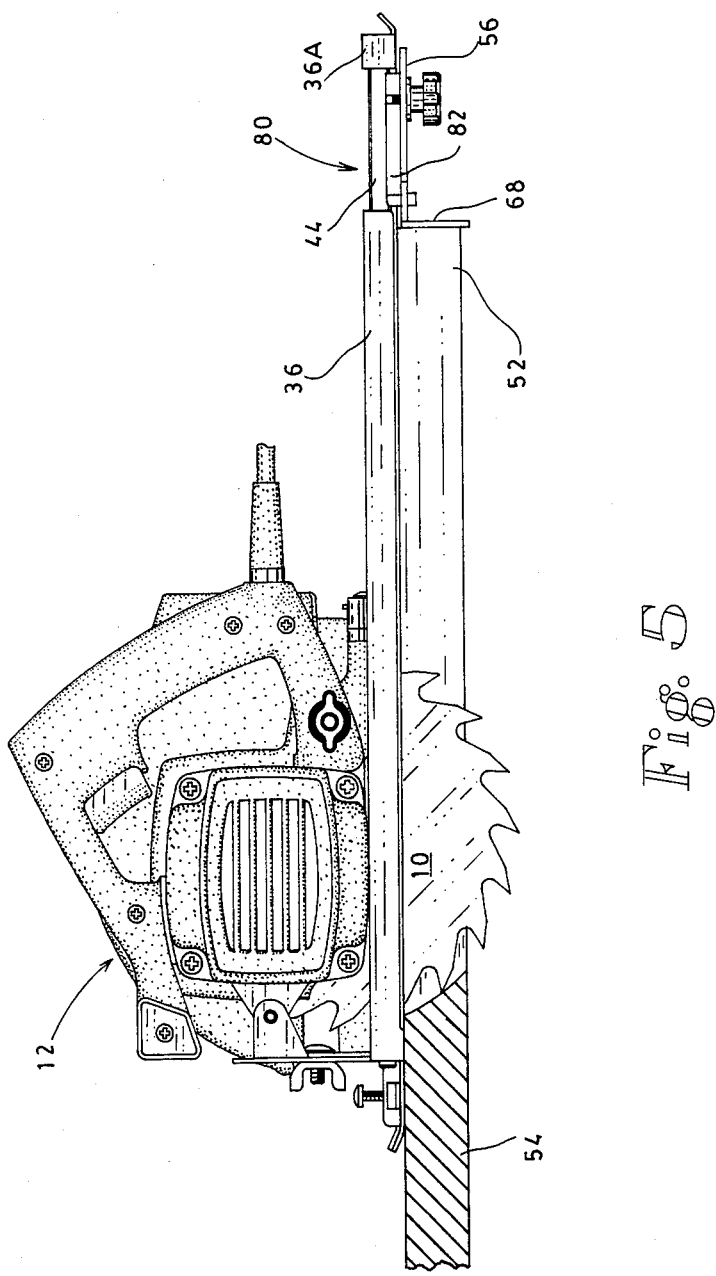

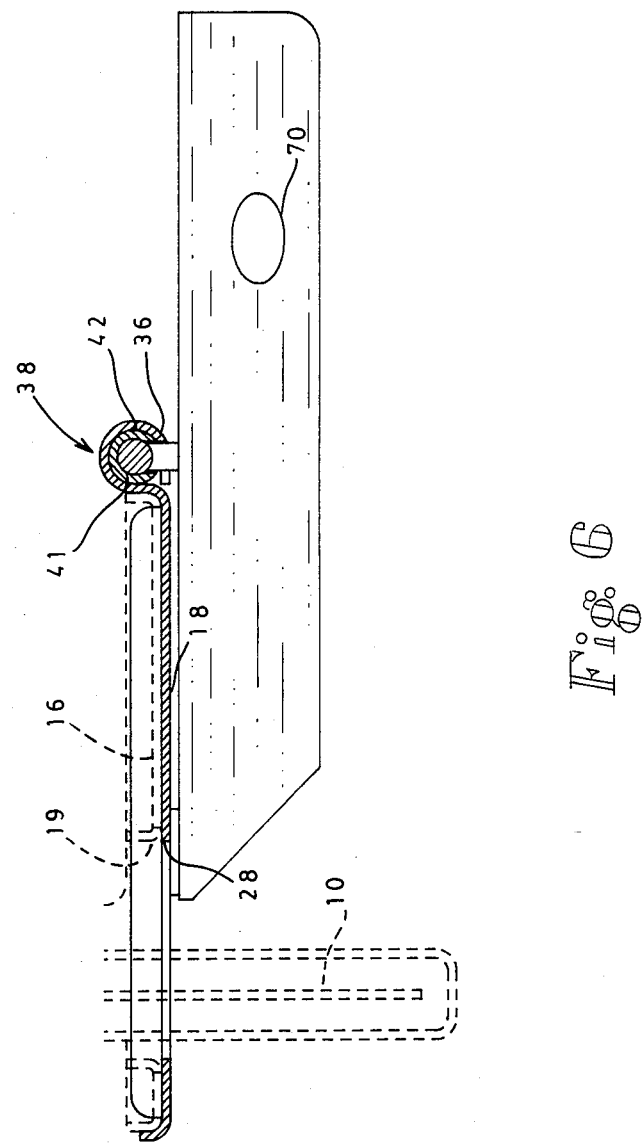

SAW GUIDE HAVING PIVOTAL PROTRACTOR MEANS

DESCRIPTION

1. Technical Field

The field of this invention is generally saw guides, and more particularly, an improved saw guide capable of controlling the linear path/direction of travel of a saw with respect to a reference. The guide can be readily pivoted for storage above the saw base plate such that the saw to which it is attached can readily be used in a conventional manner.

2. Background Art

Guide which controls the cutting motions, and more particularly, the direction or travel of rotary or jig type saw blades have heretofor been known. Typically, such guides incorporate apparatus mounted on the saw shoe or base plate. The known prior art devices generally include structures which limit the use of the saw upon attachment thereto, inasmuch as they must be removed in order to have full use of the saw in a conventional manner having unrestricted motion. Examples of typical prior art devices are disclosed in the following U.S. Pat. Nos. 2,819,742; 2,818,892; 3,344,824; 3,481,374; 3,506,062; 3,927,475; 4,016,649; 4,078,309; 4,335,512; 4,397,089; 4,483,071.

One of such known prior art patents, U.S. Pat. No. 4,078,309 discloses a mitre saw having means for adjusting the direction of travel of the saw. It will be noted while this device guides the direction of the saw travel, it must be removed in order to have full use of the saw in its conventional mode of operation. Further, it will be noted that a plurality of guiding tracks are provided, and these guiding tracks are positioned below the base plate of the saw.

Accordingly, it is an object of the present invention to provide a saw guide which can be readily mounted on the base plate or shoe of a saw, and easily pivoted to a stored position such that the saw can be used in its conventional manner with unrestricted motion.

Another object of the present invention is to provide such a guide which minimizes the loss of the effective depth of cut of the blade when mounted on the saw base plate.

Another object of the present invention is to provide such a saw guide which can be readily manufactured, and which is easy to maintain.

DISCLOSURE OF THE INVENTION

In accordance with the present invention, an improved saw guide capable of controlling the linear path/direction of travel of a rotary or jig blade type saw is provided. The disclosed guide includes a carriage, having a substantially planar surface and which defines an opening through which the saw blade extends upon mounting tne carriage to the base plate or shoe of a typical saw. A sleeve is carried by one edge portion of the carriage, and slidably receives a rod upon wnich is mounted a device for controlling the travel, or more specifically, the angle of the linear path of the saw with respect to a reference defined, normally on the object to be cut. This travel controlling mechanism can be readily moved to a stored position such that the device does not interfere with the conventional movement of the saw, if such mode of operation is desired.

BRIEF DESCRIPTION OF THE DRAWINGS

FIG. 5 is a side elevation view as shown in FIG. 4 with the saw advanced into the board or other suitable object to be cut.

FIG. 6 illustrates the protractor face plate together with the sleeve, bushing, and carriage in sectional view.

BEST MODE FOR CARRYING OUT THE INVENTION

Figure 1:
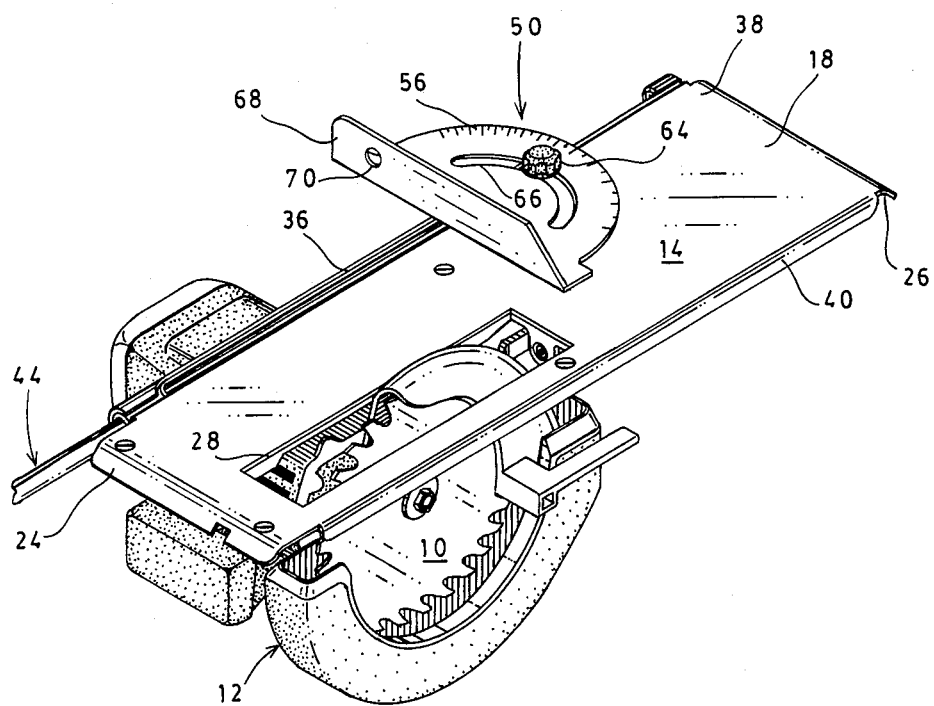
FIG. 1 is a perspective view of an embodiment of the present saw guide mounted on a conventional rotary or jig blade saw.
Figure 2:
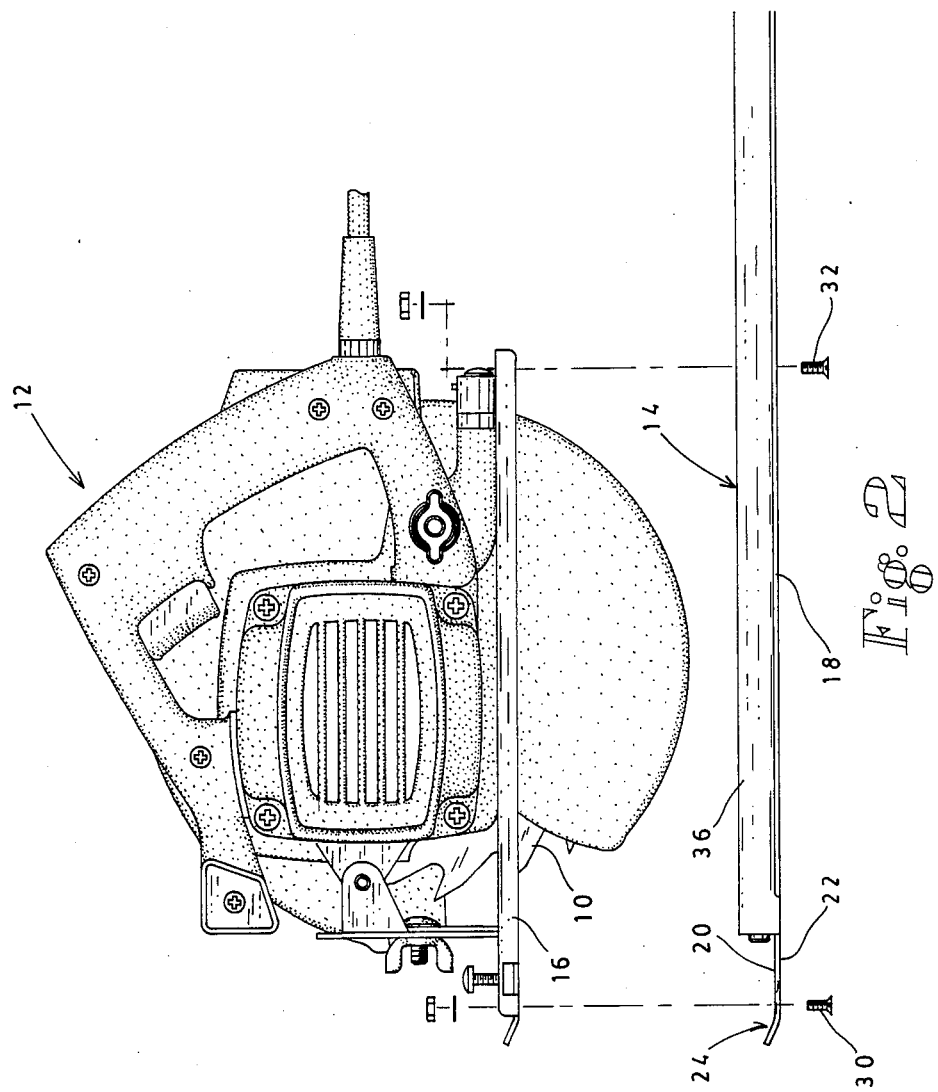
FIG. 2 is a side elevation view of the guide illustrated in FIG. 1 prior to its being mounted on saw.

Referring now to the figures, a saw guide for controlling the path/direction of travel of a rotary or jig blade 10 of a saw 12 is generally indicated at 14 in FIG. 1. This guide 14 is adapted for being secured to the base plate 16 (see FIG. 2) of a conventional skill saw or other suitable saw, such as a jig saw. The guide 14 includes a carriage 18 having an upper surface 20 and a lower surface 22. These surfaces 20 and 22 are substantially planar. The carriage 18 further includes a front edge portion 24 and a rearward edge portion 26 as shown in FIG. 1. The edge portions 24 and 26 are sloped upwardly to facilitate the sliding movement of the carriage with respect to the surface of an object which is being cut and upon which the carriage rests during cutting operations. As shown in FIG. 1, the carriage 18 defines an opening 28 which is proportioned for registering with at least a portion of the opening 19 in the juxtaposed saw blade base plate 16 through which the saw blade and guard extend as shown in FIGS. 2 and 6 below such base plate. Further, the screws 30 and 32 shown in FIG. 2 and the additional screws shown in FIG. 1 serve to secure the carriage 18 to the base plate 16 of the saw.

A sleeve generally indicated at 36 in FIG. 2 is carried by the carriage proximate longitudinal edge portion 38 of such carriage. It will be noted in FIG. 1, that the opposite longitudinal edge portion 40 of the carriage is sloped upwardly or upturned to assist in preventing a binding of the carriage with the object being cut as the carriage slides over such object. This sleeve 36 in the illustrated embodiment is fabricated by curling the longitudinal edge portions of the carriage as illustrated in FIG. 6 such that an elongated opening 41, as shown in FIG. 6, is defined therein. This opening is proportioned for receiving a bushing 42 which serves to assist in preventing binding of the sleeve and/or bushing contained therein with a rod 44 which might otherwise be occasioned by the build up of saw dust or debris therein, as will be apparent hereinafter.

Rod 44 is slidably received within the sleeve 36, or more particularly, as illustrated in FIG. 6, within the bushing 42 carried by the sleeve 36 in the preferred embodiment. This rod defines first and further end portions which are substantially coextensive with the length of the sleeve in the preferred embodiment as illustrated in FIG. 2.

Figure 3B:
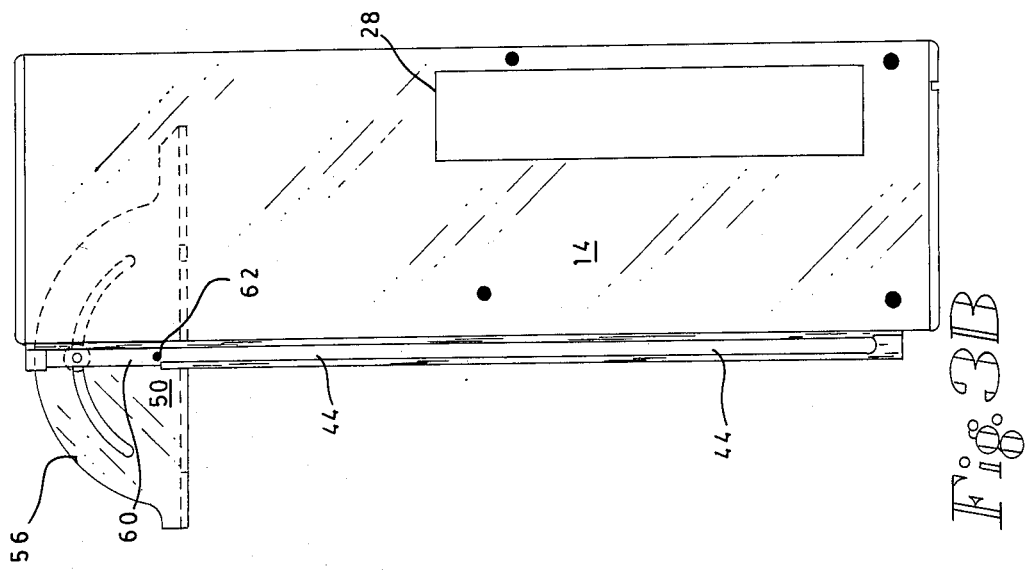
FIG. 3B illustrates the position of the protractor wh is moved to its storage location.
Figure 4:
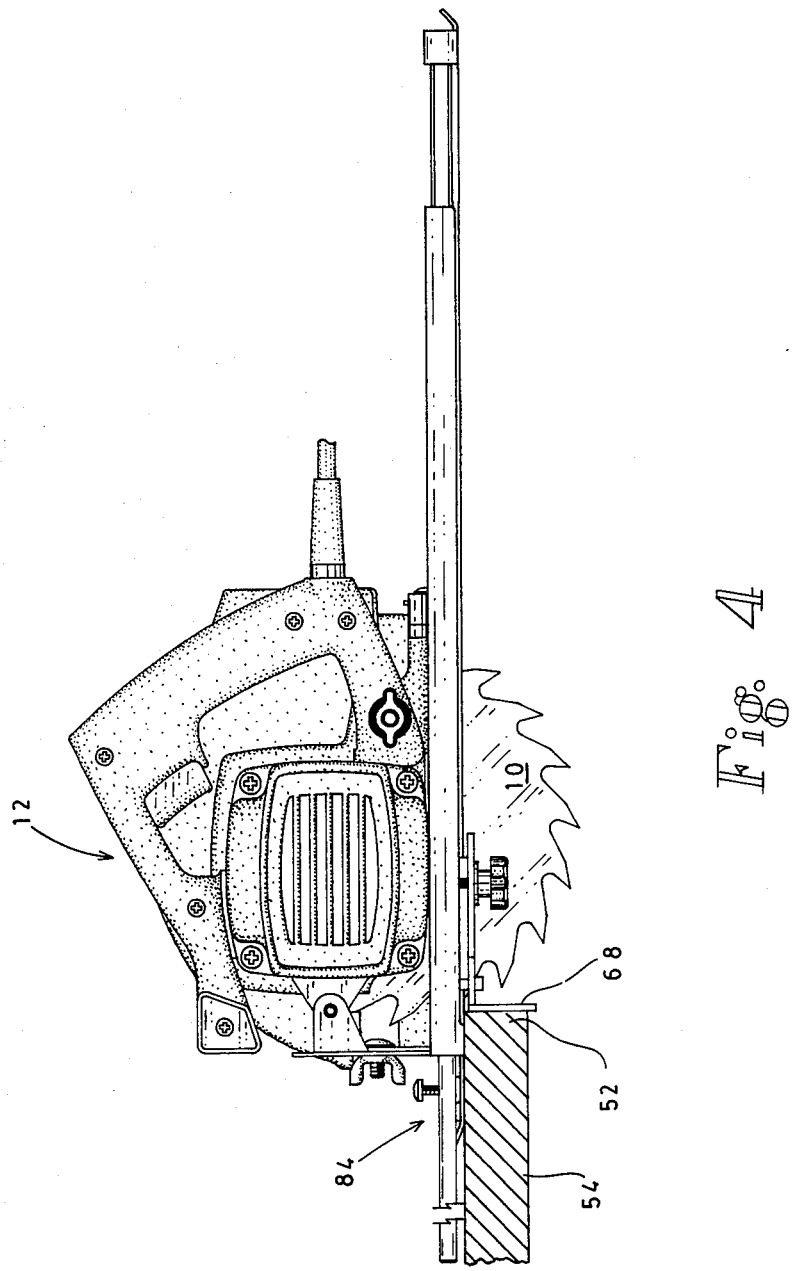
FIG. 4 IS a side elevation view of the guide mounted a saw prior to commencing the cutting operation.

A travel control mechanism is generally indicated at 50 in FIG. 1. This travel control mechanism serves to control the direction or linear path or travel of the saw from an illustrated reference 52 as illustrated in FIG. 4. This reference 52 is normally the end surface of a board 54 or another object which is being cut. The travel control mechanism includes a protractor 56. This protractor is rotatably mounted on end portion 60 of the rod 44 (see FIG. 3B), and more specifically is rotated about a pivot point 62 which comprises a suitable screw or stud connecting the protractor and the rod 44. The travel control mechanism further includes mechanism for adjusting the rotation of the protractor 56 with respect to the rod 44. This mechanism for adjusting also includes means for securing the position of the protractor with respect to the axis of the rod. This mechanism 64 comprises a suitable knob and operatively associated screw having a shaft which is received within an internally threaded bore within the end portion 60 of the rod 44. It will be noted that the shaft of the screw comprising a portion of the mechanism 64 is received within an arcuate slot 66 defined in the protractor. Thus, the position of the protractor can be adjusted and secured by unthreading or threadably removing the mechanism 64 such that the knob and/or operatively associated washer is removed from the upper surface of the protractor as shown in FIG. 1. The protractor can then be pivoted on or rotated about the pivot point 62 as illustrated in FIG. 3B, moved into a desired position and then secured again into position by screwing down the knob of the mechanism 64 such that the protractor is firmly held in position with respect to the longitudinal axis of the rod 44. It will be recognized that in this connection, a protractor face plate 68 which is integrally formed with the protractor 56 serves to engage the reference 52 (see FIG. 4). This face or face plate 68 is pivoted simultaneously with the protractor with respect to the longitudinal axis of the rod 44 by the adjustment mechanism 64.

Thus, the angle of linear travel of the saw blade with respect to the reference 52 can be controlled by adjusting the protractor and the operatively associated face plate 68 with respect to the reference 52. More specifically, as shown in FIG. 4, the face plate 68 is placed against the reference 52. The saw is then advanced as shown in FIG. 5 in the direction of the axis of the rod 44. The angle of the travel of the saw is controlled by a travel control mechanism 50, or more specifically, by the angle between the rod axis along which the device 14 slides, and the angle adjusted on the protractor.

It will be noted in FIG. 1 that means are provided to assist in sensing the movement of the protractor 56 with respect to the reference 52 during cutting operations. More specifically, a suitable finger/thumb opening 70 is provided such that an operator can simultaneously hold the face plate in position while feeling the reference 52 engaged by the face plate. Thus, any movement of the face plate with respect to the reference will be immediately sensed by the operator such that he can make proper adjustment. As shown in FIG. 1, the end portion of the face plate 68 opposite the opening 70 is sloped. This sloped end portion allows movement of the saw blade 10 past the face plate 68 when the saw blade 10 is pivoted or slanted with respect to the face plate 68 prior to commencing a cutting operation. In this manner, the saw blade does not contact the protractor means or the face plate during cutting.

Figure 7A:
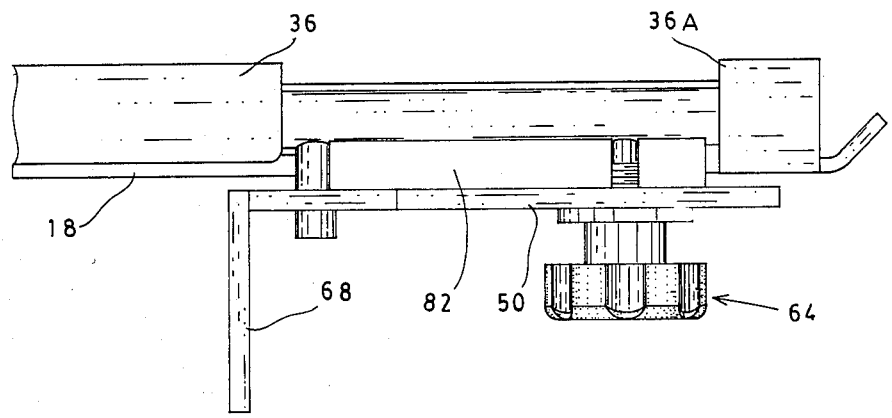
FIGS. 7A and 7B illustrate the mechanism for enabling the protractor to be pivoted out of position such that the saw can be used in its conventional manner, as desired.
Figure 7B:
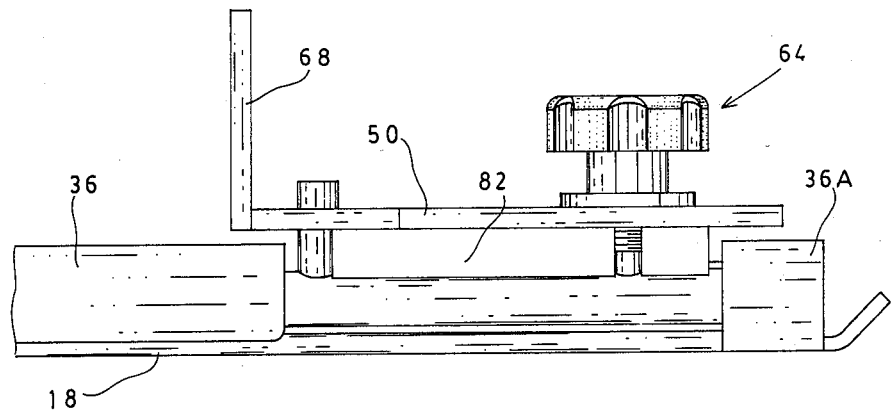

In the illustrated embodiment, storage means serves to enable pivotal movement of the protractor 56 from its position below the surface 22 of the carriage 18 (a position for controlling the travel of the device 14) to a position for storage above the surface 20 of the carriage 18. In this regard, the sleeve 36 is provided with a spaced apart end portion 36A. This spacing of the sleeve/sleeve section enables rotational or pivotal movement of the protractor from the position shown in 3A to the position shown in 3B. More specifically, in the preferred embodiment, the spacer 82 which connects the rod 44 with the protractor 56 can rotate between the sleeve 36 and the sleeve portion 36A such that the protractor can be moved to its stored location above the carriage (see FIGS. 7A and 7B, respectively).

Figure 3A:
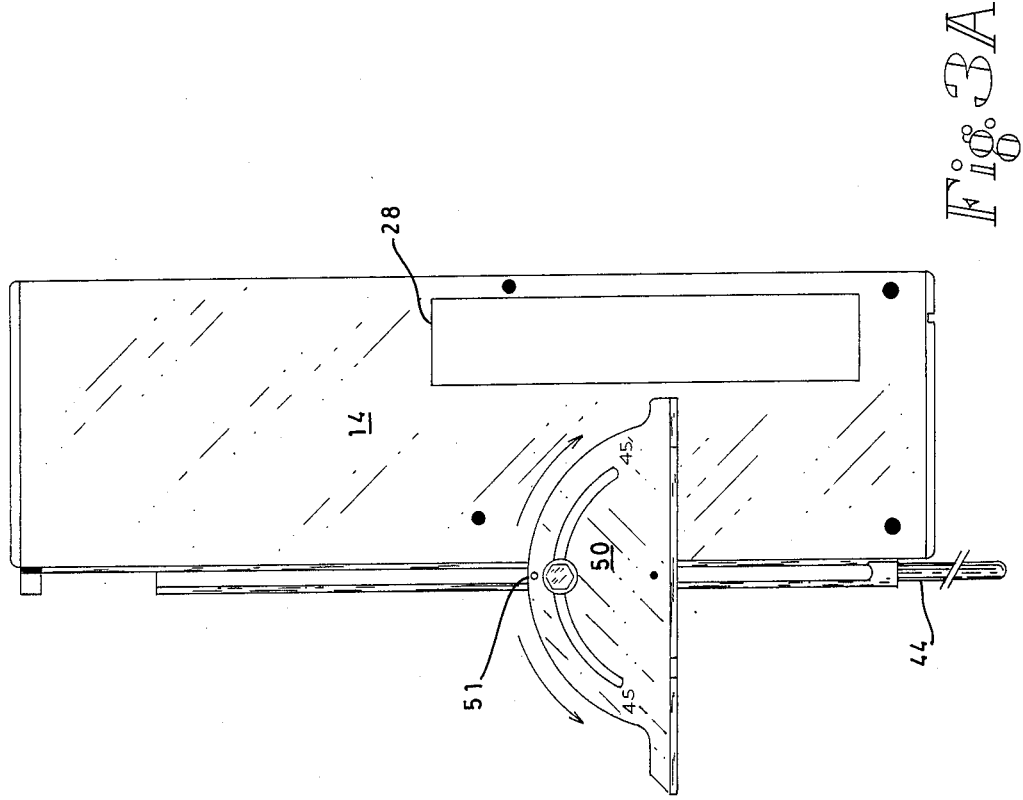
FIG. 3A is plane view of the guide illustrated in FIG. 1.

In accordance with another feature of the invention, the forward end portion proximate the location 84 as shown in FIG. 4 of the sleeve 36 is removed to allow movement of a suitable rip fence of conventional design therethrough. Further, in the embodiment shown in FIG. 3A, the pointed end portion 51 of the rod can be used to indicate the rotational position of the compass.

From the foregoing detailed description, it will be recognized that an improved saw guide has been provided which can be readily moved to a stored location when its use is not desired. The guide of the present invention is inexpensive to construct and includes a travel control mechanism which is mounted such that the deleterious effect on the depth of the cut of the blade is reduced. Various rigid and/or semi-rigid materials can be used to fabricate the guide. Further, the guide can be readily mounted on a conventional skill or jig saw without the need for a special tool or for mechanical skills. Further, it will be noted that the effective depth of the cut of the blade is reduced only by an amount substantially equal to the thickness of the carriage.

While a preferred embodiment has been shown and described, it will be understood that there is no intent to limit the invention by such disclosure, but rather it is the intention to cover all modifications and all constructions falling within the spirit and scope of the invention as defined within the appended claims.

I claim:

1. A saw guide for controlling the path/direction of travel, with respect to a selected reference on an object such as a board to be cut, of a rotary or jig saw blade during cutting operations, said guide being secured to the base plate of a rotary or jig blade type saw and including:
    a carriage having upper and lower substantially planar surfaces and defining first and further longitudinal edge portions, a forward edge portion and a rearward edge portion, said carriage defining an opening for receiving a rotary or jig saw blade therethrough, said carriage opening being proportioned for registering with at least a portion of an opening in such saw blade base plate upon mounting said carriage thereon;
    sleeve means carried by said carriage proximate one longitudinal edge portion thereof, said sleeve means defining an elongated opening;
    rod means slidably received within said opening in said sleeve means, said rod means defining first and further end portions;

travel control means for controlling the direction of travel of said saw from a reference defined on an object to be cut, said travel control means including protractor means rotatably mounted on said first end portion of said rod means, said protractor means including means for adjusting the rotational position of said protractor with respect to a longitudinal axis of said rod, and protractor face plate means which engages said reference from which the direction of travel of said saw is controlled; and storage means for enabling pivotal movement of said protractor means from a position below said lower surface of said carriage to a location proximate the upper surface of said carriage such that the motion of said saw is not controlled by said guide and said saw can be used in its conventional manner as though said guide had been removed.

2. The guide of claim 1 including means to enable sensing the movement of said protractor means with respect to said reference during cutting operations.

3. The guide of claim 1 wherein said protractor face means includes an elongated face plate having one sloped end portion to allow movement of such saw blade past said face plate means when said saw blade is slanted with respect thereto.

4. The guide of claim 1 including an elongated bushing means carried by said sleeve means, said bushing means serving to slidably receive said rod means therein, thereby assisting to prevent the binding of said rod to said sleeve as might otherwise be occasioned by a build-up of saw dust therein.

5. The guide of claim 1 wherein said protractor face means defines an opening such that an operator can place a finger/thumb in said opening to sense relative movement between said protractor means and said reference.

6. The guide of claim 1 wherein said forward edge portion and said rearward edge portion of said carriage are sloped upwardly to facilitate sliding movement of said carriage with respect to an object being cut.

7. The guide of claim 1 wherein said sleeve means is carried by said carriage at a location above said lower surface thereof whereby the sliding motion of said carriage is not restricted and the effective depth of a cut of said blade is not substantially reduced by placement of said guide on said saw.

8. A saw guide for controlling the path/direction of travel with respect to a selected reference on an object such as a board to be cut, of a rotating saw blade during cutting operations, said saw guide being secured to the base plate of a rotating blade type saw and including:

a carriage having upper and lower substantially planar surfaces and defining first and further longitudinal edge portions, a forward edge portion and a rearward edge portion, said carriage defining an opening for receiving a rotating saw blade therethrough, said carriage opening being proportioned for registering with at least a portion of an opening in such saw blade base plate upon mounting said carriage thereon;

sleeve means carried by said carriage proximate one longitudinal edge portion thereof, said sleeve means defining an elongated opening, and including an elongated bushing means carried by said sleeve means within said elongated opening;

rod means slidably received within said opening in said sleeve means, said rod means defining first and further end portions and said bushing means serving to slidably receive said rod means therein, thereby assisting to prevent the binding of said rod to said sleeve as might otherwise be occasioned by a build-up of saw dust or other debris therein;

travel control means for controlling the direction of travel of said saw from a reference defined on an object to be cut, said travel control means including protractor means rotatably mounted on said first end portion of said rod means, said protractor means including means for adjusting the rotational position of said protractor with respect to a longitudinal axis of said rod, and protractor face plate means which engages said reference from which the direction of travel of said saw is controlled;

storage means for enablin9 pivotal movement of said protractor means from a position below said lower surface of said carriage to a location proximate the upper surface of said carriage such that the motion of said saw is not controlled by said guide and said saw can be used in its conventional manner as though said guide had been removed; and means to enable sensing the movement of said protractor means with respect to said reference during cutting operations wherein said means to enable sensing the movement of said protractor means comprises an opening such that an operator can place a finger/thumb in said opening to sense relative movement between said protractor means and said reference.

9. The guide of claim 8 wherein said protractor face means includes an elongated face plate having one sloped end portion to allow movement of such saw blade past said face plate means when said saw blade is slanted with respect thereto.

10. The guide of claim 8 wherein said forward edge portion and said rearward edge portion of said carriage are sloped upwardly to facilitate sliding movement of said carriage with respect to an object being cut.

11. The guide of claim 8 wherein said sleeve means is carried by said carriage at a location above said lower surface thereof whereby the effective depth of a cut of said blade is not substantially reduced by placement of said guide on said saw.

12. A saw guide for controlling the path/direction of travel, with respect to a selected reference on an object such as a board to be cut, of a rotating saw blade during cutting operations, said saw guide being secured to the base plate of a rotating blade type saw and including:

a carriage having upper and lower substantially planar surfaces and defining first and further longitudinal edge portions, a forward edge portion and a rearward edge portion, said carriage defining an opening for receiving a rotating saw blade therethrough, said carriage opening being portioned for registering with at least a portion of an opening in such saw blade base plate upon mounting said carriage thereon;

sleeve means carried by said carriage proximate one longitudinal edge portion thereof, said sleeve means defining an elongated opening, and including an elongated bushing means carried by said sleeve means within said elongated opening;

rod means slidably received within said opening in said sleeve means, said rod means defining first and further end portions, said bushing means serving to slidably receive said rod means therein, thereby assisting to prevent the binding of said rod to said sleeve as might otherwise be occasioned by a build-up of saw dust or other debris therein;

travel control means for controlling the direction of travel of said saw from a reference defined on an object to be cut, said travel control means including protractor means rotatably mounted on said first end portion of said rod means, said protractor means including means for adjusting the rotational position of said protractor with respect to a longitudinal axis of said rod, and protractor face plate means which engages said reference from which the direction of travel of said saw is controlled, said protractor face means include an elongated face plate having one sloped end portion to allow movement of such saw blade past said face plate means when said saw blade is slanted with respect thereto;

storage means for enabling pivotal movement of said protractor means from a position below said lower surface of said carriage to a location proximate the upper surface of said carriage such that the motion of said saw is not controlled by said guide and said saw can be used in its conventional manner as though said guide had been removed; and means to enable sensing the movement of said protractor means with respect to said reference during cutting operations wherein said means to enable sensing the movement of said protractor means comprises an opening such that an operator can place a finger/thumb in said opening to sense relative movement between said protractor means and said reference.

13. The guide of claim 12 wherein said forward edge portion and said rearward edge portion of said carriage are sloped upwardly to facilitate sliding movement of said carriage with respect to an object being cut.

14. The guide of claim 12 wherein said sleeve means is carried by said carriage at a location above said lower surface thereof whereby the effective depth of a cut of said blade is not substantially reduced by placement of said guide on said saw.

* * * * *